(12) United States Patent
Treon (10) Patent No.: US 6,944,896 B2
(45) Date of Patent: Sep. 20, 2005

(54) LINE VOLTAGE COMPENSATION SYSTEM FOR POWER CHAIR

(75) Inventor: Thomas L. Treon, Versailles, OH (US)

(73) Assignee: Midmark Corporation, Versailles, OH (US)

( * ) Notice: Subject to any disclaimer, the term of this patent is extended or adjusted under 35 U.S.C. 154(b) by 0 days.

(21) Appl. No.: 10/684,049

(22) Filed: Oct. 10, 2003

(65) Prior Publication Data

US 2005/0077850 A1 Apr. 14, 2005

(51) Int. Cl.[7] .............................. G05B 11/01; A47C 1/14
(52) U.S. Cl. ........................... 5/611; 318/257; 318/268; 318/504
(58) Field of Search ................................. 318/256–260, 318/263–266, 268–272, 430–437, 500, 504; 5/600, 611, 616

(56) References Cited

U.S. PATENT DOCUMENTS

| | | | |
|---|---|---|---|
| 3,656,478 A | | 4/1972 | Swersey |
| 3,716,876 A | * | 2/1973 | Petzon et al. .................. 5/616 |
| 3,896,704 A | | 7/1975 | Barud et al. |
| 4,101,120 A | | 7/1978 | Seshima |
| 4,599,548 A | * | 7/1986 | Schultz ........................ 318/599 |
| 4,673,851 A | * | 6/1987 | Disser ........................ 388/831 |
| 4,794,655 A | | 1/1989 | Ooka et al. |
| 4,956,592 A | | 9/1990 | Schulte et al. |
| 5,163,189 A | | 11/1992 | DeGray |
| 5,329,217 A | * | 7/1994 | Kerkman et al. ........... 318/811 |
| 5,544,371 A | * | 8/1996 | Fuller ............................ 5/85.1 |
| 5,696,686 A | | 12/1997 | Sanka et al. |
| 5,715,548 A | | 2/1998 | Weismiller et al. |
| 5,771,511 A | | 6/1998 | Kummer et al. |
| 5,856,736 A | | 1/1999 | Rotunda et al. |
| 5,990,639 A | | 11/1999 | Arai et al. |
| 6,000,077 A | | 12/1999 | Cyr |
| 6,163,903 A | | 12/2000 | Weismiller et al. |
| 6,316,895 B1 | | 11/2001 | Ramarathnam |
| 6,336,235 B1 | | 1/2002 | Ruehl |
| 6,517,775 B1 | | 2/2003 | Wang et al. |
| 2002/0085950 A1 | | 7/2002 | Robitaille et al. |

OTHER PUBLICATIONS

MIDMARK, *Installation and Operation Manual 712 Power Plastic Surgery Table*, (1995).

* cited by examiner

Primary Examiner—Bentsu Ro
(74) Attorney, Agent, or Firm—Wood, Herron & Evans, L.L.P.

(57) ABSTRACT

An apparatus, method and program product position a powered examination chair at a constant, desired speed despite fluctuations line voltage. A power signal supplied to an actuating motor of the chair is apportioned according to the line voltage supplied to the chair. The desired speed may be customized by a user in the field.

31 Claims, 4 Drawing Sheets

LINE VOLTAGE COMPENSATION SYSTEM FOR POWER CHAIR

CROSS-REFERENCE TO RELATED APPLICATION

This application is related to concurrently filed U.S. patent applications entitled "Load Compensation System for Power Chair" and "Smooth Start System for Power Chair." The entire disclosures of these U.S. patent applications are incorporated into this application by reference.

1. Field of the Invention

The present invention relates to powered chairs and tables, and more particularly, to examination chairs and tables that may be automatically elevated, lowered or tilted.

2. Background of the Invention

Powered examination chairs have developed to facilitate practitioner efficiency and patient comfort. Many such chairs have automatically moveable back, foot or other support surfaces that may be positioned at a predetermined height above the floor. Support surfaces of the chair can often be manipulated to adjust the position of the person seated within, and many chairs can be lowered in order to reduce the distance between a seated patient and the floor.

The speed at which a chair is designed to move is conventionally set at a nominal, or target speed. This target speed generally consists of a range of expected speeds, and is ideally optimized for efficient and predictable chair movement. As such, a constant voltage is supplied to a motor to produce a speed that generally falls within the target range. More particularly, the supplied voltage theoretically induces an amount of revolutions per minute in the motor that will cause the chair to generally move at the target speed.

However, the speed that conventional chairs actually move can vary dramatically from this target range. This inconsistency is often attributable to variance in the line voltage supplied to the chair. Fluctuation in line voltage causes the number of revolutions per minute of the chair motor to vary. Consequently, the speed at which the chair moves reflects this variance, and the chair often fails to move at the target speed.

Some designers attempt to mitigate this variance by setting the target speed of their chair motors according to a median, estimated line voltage level. Notably, this estimated line voltage is a static figure. That is, the voltage supplied to the motor to induce revolutions is set according to a single, standard or median line voltage. In this manner, voltage supplied to the motor of a conventional chair is set at a level that will generally achieve the target speed when the line voltage is at the estimated level.

Line voltage, however, can vary dramatically depending upon where and when the chair is used. For example, line voltage fluctuation of more than thirty percent is not uncommon. As the voltage level supplied to the motor is set exclusively to the estimated line voltage, deviation from that standard line voltage affects the amount of voltage supplied to the motor. This affect translates into the motor moving the chair at a rate that deviates from the target speed. That is, the chair moves at a faster rate when the line voltage is above the estimated figure, and at a slower rate when the line voltage dips below the estimate. This variance and unpredictability poses an inconvenience and distraction to healthcare professionals and patients, alike.

As a consequence, what is needed is an improved manner of automatically adjusting the position of a power chair that accounts for variance in line voltage.

SUMMARY OF THE INVENTION

The present invention provides an improved method, apparatus and program product for automatically positioning a powered chair at a desired speed that accounts for variance in line voltage. That is, a chair in accordance with the principles of the present invention is positioned at a desired speed irrespective of line voltage fluctuation. In one sense, the desired speed may be achieved by apportioning voltage to the motor according to the determined line voltage. For example, a constant motor speed may be achieved by compensating for variations in line voltage supplied to the chair.

More particularly, a control signal indicative of the line voltage is used to determine a voltage, or magnetic force, that should be included in a power signal. That power signal is applied to a motor to produce the desired speed. Such determination processes as are consistent with the principles of the present invention may include determining the voltage applied to the motor. Because this determined voltage is proportional to the voltage supplied to the motor, it is proportional to or otherwise indicative of the speed of the motor.

This determined voltage may them be compared to a reference voltage. The duty cycle of a power signal supplied to the motor is modified according to the voltage comparison. The reference voltage is typically associated with a desired speed and may be customized during manufacturing or in the field, where allowed. The desired speed may relate to either or both the motor speed and the speed at which the chair moves. Where advantageous, line voltage and/or other determinations may be correlated to power levels stored within a memory.

Another of the same embodiment that is consistent with the principles of the present invention may additionally compensate for load forces to maintain the desired speed. An exemplary load force may include the weight of a patient, as well as other gravitational and mechanical forces associated with chair travel. As such, the desired speed is achieved by apportioning power to the motor according to both the line voltage and the load.

By virtue of the foregoing there is provided an improved chair positioning system that addresses shortcomings of the prior art. These and other objects and advantages of the present invention shall be made apparent in the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiment given below, serve to explain the principles of the invention.

DETAILED DESCRIPTION OF THE PREFERRED EMBODIMENTS

Figure 1:
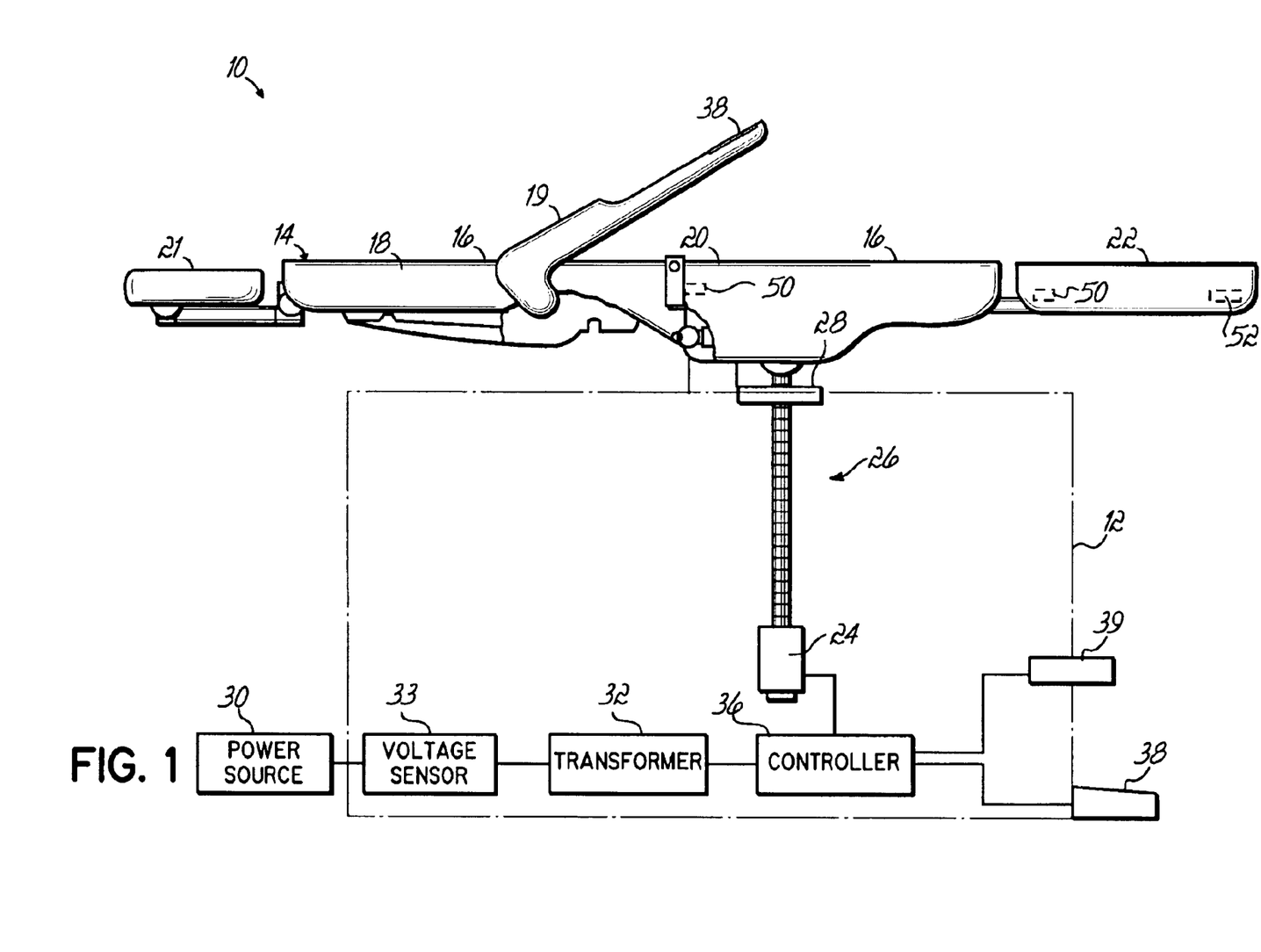
FIG. 1 shows a schematic diagram of a chair system in accordance with the principles of the present invention.

FIG. 1 shows chair system 10 that may be positioned at a desired speed in accordance with the principles of the present invention. The chair system 10 includes a moveable column 12 to which a support surface 14 is mounted. Upholstered sections 16 are removable and mounted to the support surface 14. As shown in FIG. 1, the support surface 14 comprises a back support 18 and a head support 21 that pivotally attach to a seat support 20. The support surface 14 additionally includes a foot support 22, which also pivotally attaches to the seat support 20. The chair system 10 illustrated in FIG. 1 is equipped with powered tilt and elevation and may be positioned in a number of ways.

The block diagram of FIG. 1 shows a motor 24 configured to power an actuator 26. A motor 24 comprises a direct current (DC) motor. One skilled in the art, however, will appreciate that any manner of electric motor, including alternating current (AC) motors, may be alternatively used in accordance with the principles of the present invention.

An actuator 26 consistent with the principles of the present invention includes any device configured to initiate movement of the support surface 14. The actuator 26 may include a screw shaft and gearing for enabling the motor to rotate the screw shaft. For this purpose, a nut may be mounted on each shaft for converting the rotary motion of the shaft into linear motion of an actuator arm 28. The actuator arm 28, in turn, positions the support surface 14. While only one motor 24 and actuator 26 are shown in FIG. 1, one skilled in the art will appreciate that several such motors and/or actuators may be used to position a chair system 10 in accordance with the principles of the present invention.

A source 30 supplies voltage to a transformer 32, which powers the chair system 10 of FIG. 1. An exemplary transformer 32 steps down voltage from the power source 30 for hardware convenience and operating considerations. A suitable source 30 may include DC and AC input voltage. The power source 30 provides a line voltage to the chair system 10. As discussed herein, the line voltage may vary according to time and the geographic location of the source 30. In one embodiment that is consistent with the present invention, the system 10 includes a line voltage detection device 33 configured to determine line voltage directly from the source. One skilled in the art will appreciate that any number of such devices may be placed throughout the system to determine a voltage measurement that is indicative of line voltage.

More particularly, the motor 24 of the chair system 10 receives power from motor control circuitry 34 of a controller 36. The motor control circuitry 34 produces a power signal having a fixed frequency and adjustable pulse width. As such, the controller 36 of the embodiment shown in FIG. 1 generates pulse width modulated (power) signals including a variable duty cycle. The power signal delivers a variable voltage to the motor 24. Using this pulse width modulated scheme, the motor speed is held constant despite changes in line voltage. For purposes of this specification, motor "speed" may alternatively be referred to as "revolutions per minute."

The controller 36, in turn, may receive control inputs from a series of switches, pedals, cartridges, diskettes and/or sensors comprising user input devices 38. Such input may comprise a control signal in an embodiment of the present invention. Other control signal sources may include output from voltage sensing circuitry 42, which may be internal or external to the controller 36. Exemplary voltage sensing circuitry 42 comprises a device configured to determine the voltage delivered to the motor 24 or present at any other location within the chair system 10. Where desirable, input sources may further include position sensors 50 and limit switches 52 for detecting and limiting the positions and movement of the support surface 14. Still another control signal source and user input may comprise a voltage regulator device 39 that may be inserted or otherwise positioned within the chair system 10. Such a voltage regulator device 39 may include a card, cartridge, diskette or other medium including a circuit or program configured to set a reference voltage or otherwise affect the control signal.

Figure 2:
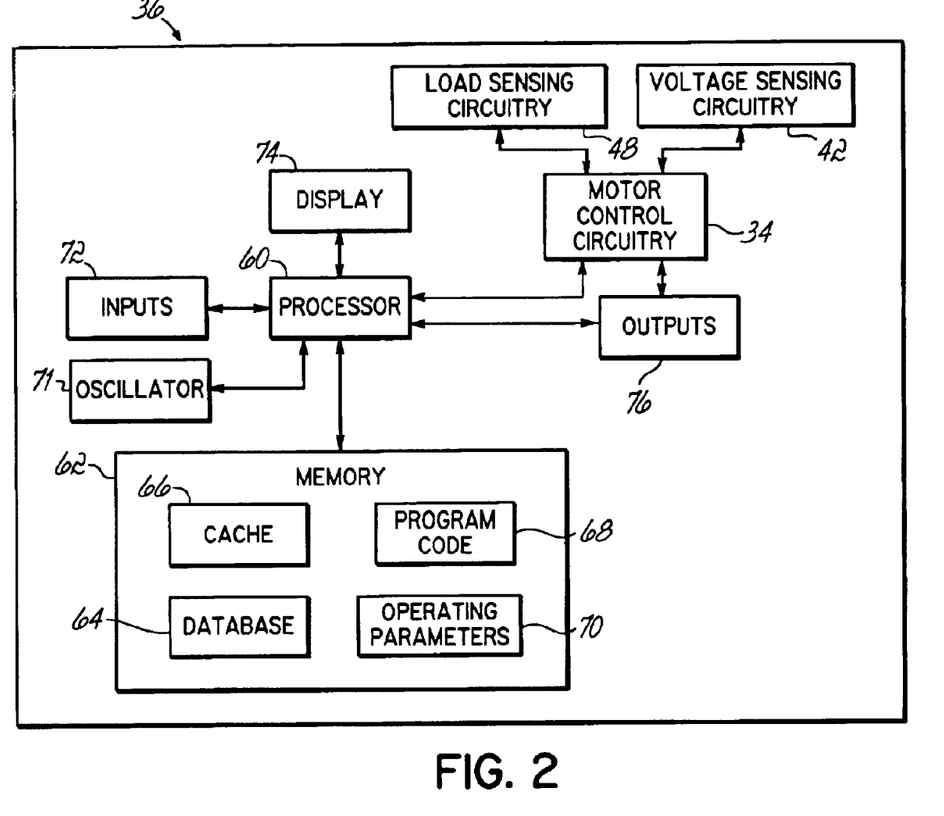
FIG. 2 shows a block diagram of the controller of FIG. 1.

FIG. 2 is a block diagram of the controller 36 of FIG. 1. As shown in FIG. 2, the controller 36 may include one or more processors 60. The controller 36 may additionally include a memory 62 accessible to the processor 60. The memory 62 may include a database 64 and/or cache memory 66. For instance, a database may contain lookup values for correlating a control signal indicative of a line voltage to a reference voltage or other power level. Another exemplary database may include a lookup feature for correlating a voltage magnitude to a signal profile. For example, a voltage magnitude may be correlated to a duty cycle parameter. Cache memory 66 may be used to temporarily store a sensed voltage or current, for instance.

The memory 62 may also include program code 68. Such program code 68 is used to operate the chair system 10 and is typically stored in nonvolatile memory, along with other data the system 10 routinely relies upon. Such data may also include operating parameters 70 such as predefined reference voltages, crash avoidance and program addresses. Program code 68 typically comprises one or more instructions that are resident at various times in memory 62, and that, when read and executed by the processor 60, cause the controller 36 to perform the steps necessary to execute functions or elements embodying the various aspects of the invention.

The controller 36 also receives and outputs data via various input devices 72, a display 74 and an output device 76. A network connection may comprise another input device 72 that is consistent with the principles of the present invention. Exemplary input device 72 may include hand and foot pedals 38, a voltage regulator device 39, limit switches and position sensors, as well as an oscillator 71. Still other input devices may include service and program ports. A suitable display 74 may be machine and/or user readable. Exemplary output(s) 76 may include a port and/or a network connection. As such, the controller 36 of an embodiment that is consistent with the principles of the present invention may communicate with and access remote processors and memory, along with other remote resources.

The controller 36 of FIG. 2 includes motor voltage sensing circuitry 42 that comprises a device configured to measure voltage applied to and/or the rotational speed of the motor 24. The controller 36 further includes motor load sensing circuitry 48. The motor load sensing circuitry 48 comprises a device that measures current through and/or the rotational speed of the motor 24. While the controller 36 of FIG. 2 includes voltage sensing circuitry 42 and load sensing circuitry 48, one skilled in the art will appreciate that other embodiments that are consistent with the invention may alternatively include voltage and load sensing circuitry equivalents external to the controller. Moreover, one of skill in the art will appreciate that the functionality of the voltage sensing circuitry 42 and load sensing circuitry 48, as with all functionality of the controller 36 and electrical components of the chair system 10, may alternatively be realized in an exclusively or hybrid software environment. Furthermore, a controller for purposes of this specification may include any device comprising a processor.

The processor 60 optically or otherwise interfaces with and provides instructions to the motor control circuitry 34. The motor control circuitry 34 receives input from the motor voltage sensing circuitry 42 to determine a control signal that is directly proportional to the line voltage and/or the speed of the motor 24. Where applicable, the motor control circuitry 34 could alternatively receive a control signal from a voltage senor 33 that is directly proportional to line voltage. The motor control circuitry 34 further compares the control/speed signal to a stored reference voltage. If they do not match within predefined parameters, the controller 36 may generate an error signal. The motor control circuitry 34 processes the error signal to determine how to modulate the pulse width (and duty cycle) of the power signal.

While embodiments that are consistent with the principles of the present invention have and hereinafter will be described in the context of fully-functioning controllers, computers, and processing systems, those skilled in the art will appreciate that various embodiments of the invention are capable of being distributed as a program product in a variety of forms, and that the invention applies equally regardless of the particular type of signal-bearing media used to actually carry out the distribution. Examples of signal bearing media include, but are not limited to recordable type media such as volatile and non-volatile memory devices, floppy and other removable disks, hard drives, magnetic tape, optical disks (e.g., CD-ROMs, DVDs, etc.), among others, and transmission type media such as digital and analog communication links.

In addition, various program code described hereinafter may be identified based upon the application within which it is implemented in the specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which programs may be organized into routines, procedures, methods, modules, objects, and the like, as well as the various manners in which program functionality may be allocated among various software layers that are resident in a typical processor (e.g., operating systems, applets, etc.), it should be appreciated that the invention is not limited to the specific organization and allocation of program functionality described herein.

Figure 3:
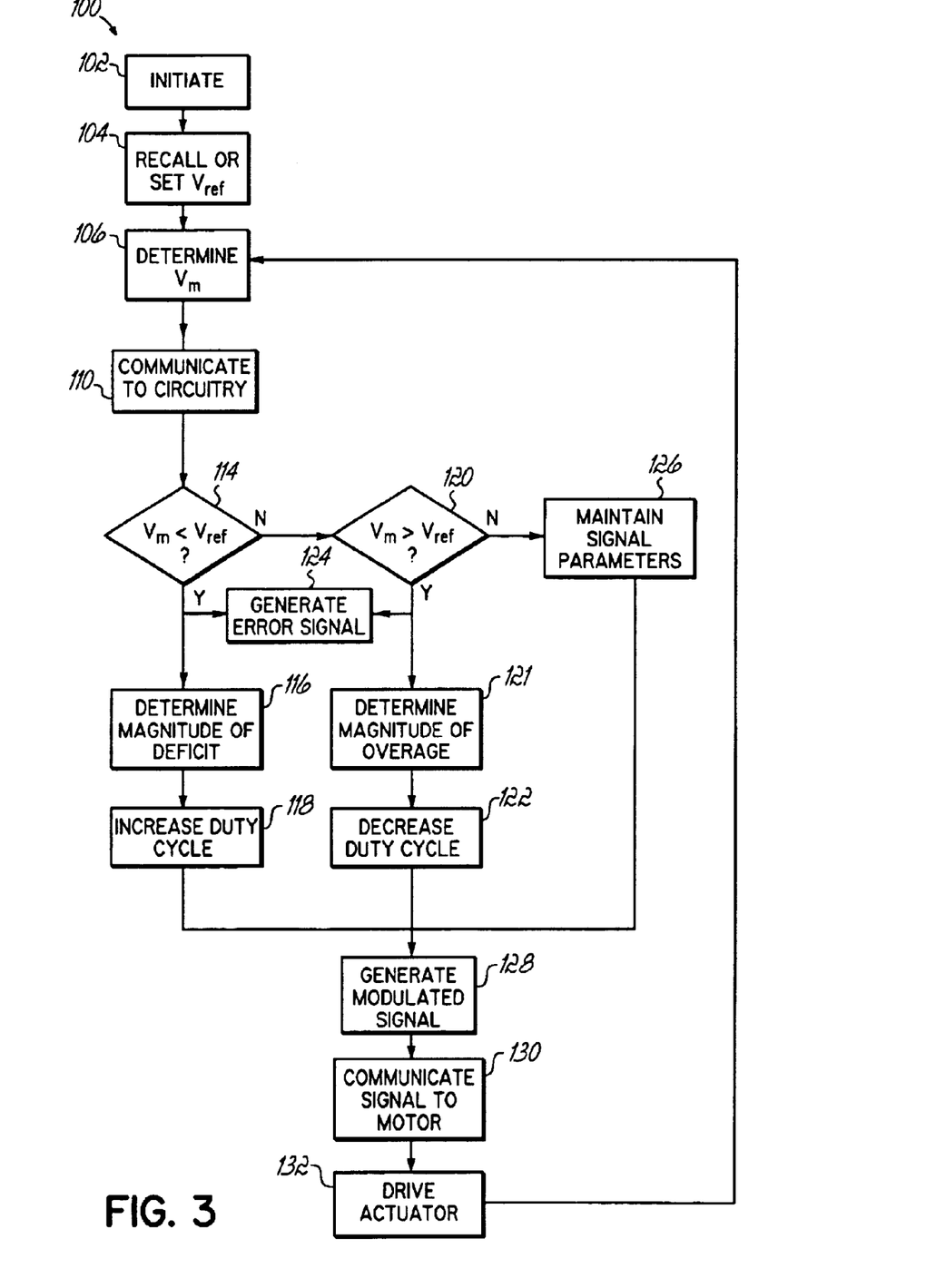
FIG. 3 is a flowchart having a sequence of steps executable by the system of FIG. 1 for automatically positioning a chair at a desired speed using a determined voltage measurement.

FIG. 3 is a flowchart 100 having a sequence of steps configured to move a support surface 14 at a desired speed and irrespective of line voltage. Turning more particularly to the flowchart 100, a user may initiate processes that are consistent with the present invention at block 102. Such processes may include booting relevant program code 68, as well as receiving user/automated inputs 72, such as commands to move a support surface 14. Other processes performed at block 102 may include initializing applicable memory 62. For example, initialization processes may prompt the recall from memory 62 of a reference voltage, $V_{ref}$, as shown in block 104.

While the reference voltage is typically preset during manufacturing, the reference voltage may alternatively or additionally be programmatically modified in the field. For example, a doctor or technician may use an interface 38 to increase or decrease the desired speed. Another or the same embodiment allows the user to specify and alter speeds particular to different components of a support surface 14, such as a back or foot support 18 and 22, respectively. Still another embodiment that is consistent with the principles of the present invention allows a user to specify different desired speeds according to different directions traveled by the components of the support surface 14. Access to such customized speed control may be restricted by codes and/or preset factory limitations. For instance, program code 68 of the chair system 10 may prevent a doctor from setting a speed that exceeds a ceiling, or maximum speed.

A user of the same or of another embodiment that is consistent with the principles of the present invention may alternatively insert or otherwise position a voltage regulator device 39 within the chair system 10 at block 104. Such a voltage regulator device 39 may include a card, cartridge, diskette or other medium including a circuit or program configured to set a reference voltage or otherwise affect the control signal. As such, a user could orient and/or attach the voltage regulator device 39 depending upon whether the chair system 10 was located on the East or West Coast, for instance. The voltage regulator device 39 could thus mitigate the affects of line voltage fluctuation associated with each locale.

In any case, an exemplary reference voltage is typically set in proportion to a desired speed. More particularly, voltage applied across the motor 24 is roughly proportional to the revolutions per minute (rpm's) of the motor 24. The rpm's, in turn, are translatable into a distance traveled by a support surface 14 in a determinable period of time. Thus, the reference voltage can be set at a magnitude that generally or precisely corresponds to a desired speed.

An embodiment consistent with the principles of the present invention may use a stepped-down or derivative voltage level as the reference voltage. For instance, a voltage of 48 volts delivered to the motor 24 may correspond to a reference voltage of 5 volts. This stepped-down voltage may have signal processing advantages.

The reference voltage is used as a point of comparison for the determined voltage conveyed in the line voltage signal. To this end, a voltage sensing circuitry 42 may measure at block 106 a motor voltage, $V_m$, delivered to the motor. As discussed herein, the measured motor voltage may be stepped down to accommodate circuitry specifications. The determined voltage is communicated to the motor control circuitry 34 at block 110.

As shown at block 114, the comparison of the determined motor voltage ($V_m$) to the voltage reference ($V_{ref}$) may determine if the duty cycle of a power signal delivered to the motor 24 should be modified. For example, where the applied voltage is less than the reference voltage (as present in a low line voltage scenario), the motor control circuitry 34 of the controller 36 may increase the duty cycle at block 118 according to the difference between the applied voltage and the reference voltage, as determined at block 116 of FIG. 3. Of note, this determined difference may take into account any scaling or other processing used to step down a motor voltage, as discussed in connection with block 106. Moreover, one of skill in the art will appreciate that, where so configured, the difference may alternatively be used to step up motor voltage in another embodiment that is in accordance with the principles of the present invention.

If the determined voltage at block 120 is alternatively found to be greater than the reference voltage, then the duty cycle of the power signal may be decreased at block 122. Such may be the case where the line voltage is high. The duty cycle may be decreased at block 122 in proportion to the difference between the determined voltage and the reference voltage.

If the applied voltage at block 120 is alternatively determined to be greater than the reference voltage, then the duty cycle of the power signal may be decreased at block 122. The duty cycle may be decreased at block 122 in proportion to the difference between the actual voltage and the reference voltage.

Where so configured at block 124, a control signal comprising an error signal may be initiated by motor control circuitry 34 in response to a discrepancy between the applied and reference voltages. The error signal generated at block 124 will automatically initiate modification of the duty cycle in proportion to a change in the line voltage, and in an embodiment discussed below, in proportion to a change in motor load. Where the determined voltage of the control signal is alternatively equal to or otherwise within acceptable tolerances of the reference voltage, the duty cycle of the power signal is maintained, as indicated at block 126 of FIG. 3.

In any case, the motor control circuitry 34 responds to a command to increase or decrease the duty cycle of the motor 24 by generating a pulse width modulated signal as shown at block 128. The resultant power signal is then communicated to the motor 24 at block 130. In this manner, the actuator 26 is continuously driven at block 132 at the desired speed.

The sequence of steps of the flowchart 100 of FIG. 3 may be accomplished automatically and in realtime. Thus, the power supplied to the motor 24 is continuously and automatically adjusted to maintain the desired speed. Moreover, this dynamic adjustment may be accomplished in a manner that is transparent to the patient and/or healthcare professional. That is, a control signal indicative of the line voltage is constantly monitored in a feedback loop that continuously apportions power to the motor 24 to maintain the desired speed.

Figure 4:
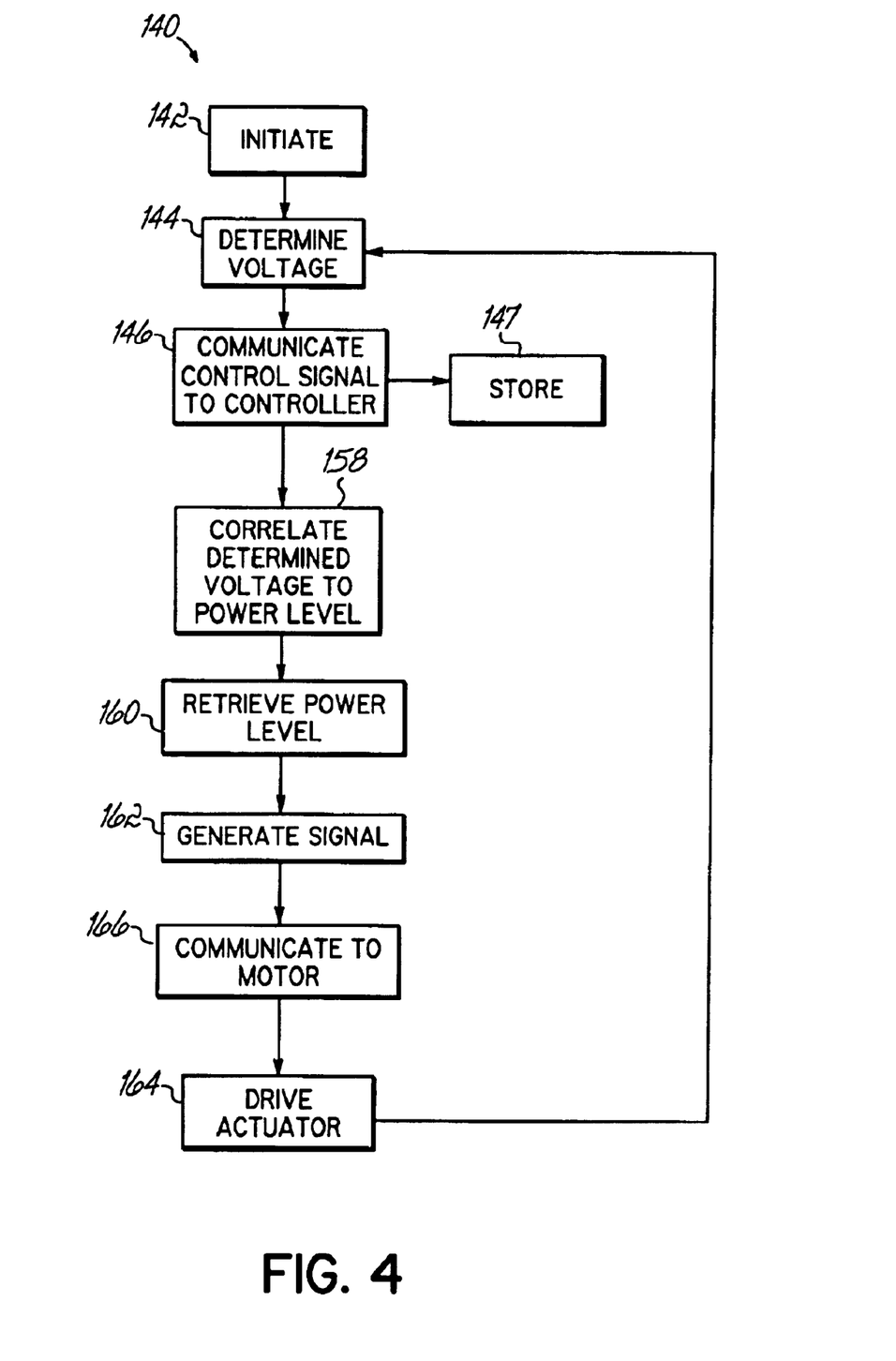
FIG. 4 is a flowchart having a sequence of steps suited for execution by the system of FIG. 1 for automatically positioning a chair at a desired speed using a lookup table.

FIG. 4 shows a sequence of process steps in accordance with the principles of the present invention. That is, the flowchart 140 of FIG. 4 includes method steps suited for automatically achieving a desired speed irrespective of line voltage fluctuation. In one respect, the processes of FIG. 4 achieve the desired speed using a lookup table. That is, a control signal indicative of line voltage is correlated to a stored power level.

Turning more particularly to the flowchart 140 of FIG. 4, a user may initiate program code 68 and memory processes of the chair system 10 at block 142 of FIG. 4. The line voltage or another determined voltage indicative of line voltage provided to the chair system 10 is determined at block 144. The line voltage may be sensed or otherwise determined at block 144 by using the motor control circuitry 34 and voltage sensing circuitry 42 as shown in FIG. 4. Alternatively, the line voltage may be determined at block 144 of FIG. 4 using a voltage sensor positioned elsewhere in communication with the chair system 10. One skilled in the art will appreciate that any number of methods of determining line voltage may alternatively be included within processes that are consistent with the principles of the present invention.

As shown in the embodiment of FIG. 4, the voltage determined at block 144 is communicated to the controller 36 at block 146. The controller 36 may store the determined voltage value at block 147 within its memory 62

At block 150, the program code 68 of the controller 36 may correlate a control signal comprising the stored and/or determined voltage to a power level field of a database 64. Such a database 64 may include a plurality of stored power levels and determined voltage values. Each stored power level of the database 64 logically associates with the respective determined voltage value. The controller 36 then retrieves from the database 64 the power level correlated to the desired speed in response to receiving the control signal.

Where appropriate, the power level field and the determined voltage value may further be logically associated with a field corresponding to a load value, which may include forces associated with the weight of a patient and/or a direction traveled by a support surface 14. As discussed herein, load for purposes of this specification may include a patient weight, voltage or other measurement relating to work required by a motor 24 in moving a support surface 14.

In any case, the system retrieves the appropriate power level associated with the desired speed from memory 62 at block 160. The retrieved power level is used to generate the power signal at block 162, which is communicated to the motor 24. The motor 24, in turn, drives the actuator 26 at block 166 as the chair system 10 continues to dynamically monitor a control signal indicative of line voltage at block 142.

While the present invention has been illustrated by the description of embodiments thereof, and while the embodiments have been described in considerable detail, it is not intended to restrict or in any way limit the scope of the appended claims to such detail. For example, when the term "chair" is used above, it is intended to include the terms "table" and "bed." Additional advantages and modifications will be readily apparent to those skilled in the art.

For instance, embodiments that are consistent with the principles of the present invention may adjust the power signal according to both line voltage and determined load. As such, the control signal comprising the determined voltage as discussed above may account for load considerations. The control signal of the same or another embodiment that is consistent with the principles of the present invention may comprise input from position sensors 50. That is, the position sensors 50 may be used determine the speed at which the support surface 14 moves. As discussed herein, the detected speed is proportional to rpm's generated by the motor 24. These rpm's, in turn, are proportional to the voltage used to generate speed. In any case, the detected speed or determined voltage value may be fed back to the controller 36 via the control signal. The controller 36 may then compare the speed conveyed in the control signal to a reference value. The reference value may be associated with a desired speed. If the controller 36 determines that there is a disparity between the control signal and the reference, the controller 36 may increase or decrease the voltage delivered to the motor according to the determined disparity.

The invention in its broader aspects is therefore not limited to the specific details, representative apparatus and method, and illustrated examples shown and described. For instance, any of the exemplary steps of the above flowcharts may be augmented, replaced, omitted and/or rearranged while still being in accordance with the underlying principles of the present invention. Accordingly, departures may be made from such details without departing from the scope or spirit of Applicant's general inventive concept.

What is claimed is:

1. A method of positioning a patient support apparatus powered by a line voltage at a desired speed, comprising:
   receiving a control signal indicative of the line voltage supplied to the patient support apparatus; and driving a motor configured to move the patient support apparatus at the desired speed using the control signal, wherein driving the motor further includes driving the motor at the desired speed for a first period corresponding to a first portion of a distance traveled by the support apparatus and at a second desired speed for a second period corresponding to a second portion of the distance traveled by the support apparatus.

2. The method of claim 1, wherein using the control signal further includes customizing the desired speed.

3. The method of claim 1, wherein receiving the control signal further includes determining a voltage indicative of the line voltage.

4. The method of claim 1, wherein receiving the control signal further includes receiving input from a voltage regulator device.

5. The method of claim 1, wherein receiving the control signal further includes determining a voltage delivered to the motor.

6. The method of claim 1, wherein receiving the control signal further includes receiving a measurement determined by at least one of a: a voltage sensor and a current sensor.

7. The method of claim 1, wherein driving the motor further includes comparing a determined voltage to a reference voltage.

8. The method of claim 1, wherein driving the motor further includes modifying a duty cycle of the motor according to the control signal.

9. The method of claim 1, wherein driving the motor further includes correlating the control signal to a power level associated with the desired speed.

10. The method of claim 1, wherein driving the motor further includes increasing a duty cycle if a determined voltage is less than a reference voltage.

11. The method of claim 1, wherein driving the motor further includes decreasing a duty cycle if a determined voltage is greater than a reference voltage.

12. The method of claim 1, wherein driving the motor further includes generating the control signal.

13. The method of claim 1, wherein receiving the control signal further includes receiving at least one of: directional data indicative of a desired direction of movement of the support surface, a speed measurement, a voltage level, a load and a patient weight.

14. A method of positioning a patient support apparatus at a desired speed, comprising:
receiving input indicating a desired speed at a controller of the patient support apparatus, wherein the patient support apparatus includes a moveable support surface, wherein receiving the input further includes receiving input particular to at least one of a direction, a first portion of a distance traveled by the movable support apparatus, and a second desired speed for a second period corresponding to a second portion of the distance traveled by the movable support apparatus;
processing the input to generate a control signal; and
moving the moveable support surface at the desired speed in response to receiving the control signal.

15. The method of claim 14, wherein receiving the input further includes receiving a reference voltage.

16. The method of claim 14, further comprising programmatically restricting a range in which the movable support surface moves.

17. The method of claim 14, wherein processing the input further includes correlating the input to a power level.

18. A patient support apparatus, comprising:
a moveable support surface;
an electric motor for driving the moveable support surface at a desired speed in response to a power signal comprising a power level;
a sensor having an output used to generate a control signal indicative of line voltage supplied to the patient support apparatus; and
a controller for processing the control signal and initiating generation of the power signal according to the control signal.

19. The apparatus of claim 18, wherein the control signal includes a voltage indicative of the line voltage.

20. The apparatus of claim 18, further comprising an input means for modifying the desired speed.

21. The apparatus of claim 18, wherein the controller is configured to compare a determined voltage derived from the control signal to a reference voltage.

22. The apparatus of claim 18, wherein the controller is configured to modify a duty cycle of the motor according to the control signal.

23. The apparatus of claim 18, wherein the controller is configured to correlate the control signal to a power level associated with the desired speed.

24. The apparatus of claim 18, wherein the controller is configured to increase a duty cycle if a voltage used to generate the control signal is less than a reference voltage.

25. The apparatus of claim 18, wherein the controller is configured to decrease a duty cycle if a voltage used to generate the control signal is greater than a reference voltage.

26. The apparatus of claim 18, further comprising an actuator for mechanically cooperating with the motor to move the moveable support surface.

27. The apparatus of claim 18, wherein the desired speed changes according to the relative position of the moveable support surface.

28. The apparatus of claim 18, wherein the sensor includes a resistor.

29. The apparatus of claim 18, wherein the sensor is configured to determine a current flowing through the electric motor.

30. The apparatus of claim 18, wherein the sensor is configured to determine a motor voltage applied to the electric motor.

31. A patient support apparatus, comprising:
a moveable support surface;
an electric motor for driving the moveable support surface at a desired speed in response to a power signal;
an input mechanism for receiving input indicating the desired speed, wherein receiving the input further includes receiving input particular to at least one of a direction, a first portion of a distance traveled by the movable support surface, and a second desired speed for a second period corresponding to a second portion of the distance traveled by the movable support surface; and
a controller for initiating generation of the power signal configured to cause the electric motor to drive the moveable support surface at the desired speed, wherein the power signal is generated according to the desired speed.

* * * * *

(12) EX PARTE REEXAMINATION CERTIFICATE (7834th)

United States Patent
Treon (10) Number: US 6,944,896 C1
(45) Certificate Issued: Oct. 26, 2010

(54) LINE VOLTAGE COMPENSATION SYSTEM FOR POWER CHAIR

(75) Inventor: Thomas L. Treon, Versailles, OH (US)

(73) Assignee: Midmark Corporation, Versailles, OH (US)

Reexamination Request:
No. 90/010,336, Nov. 10, 2008

Reexamination Certificate for:
Patent No.: 6,944,896
Issued: Sep. 20, 2005
Appl. No.: 10/684,049
Filed: Oct. 10, 2003

(51) Int. Cl.
*G05B 11/01* (2006.01)

(52) U.S. Cl. .............................. 5/611; 318/257; 318/268
(58) Field of Classification Search .................. 177/147, 177/245, 211; 104/126; 212/175
See application file for complete search history.

(56) References Cited

U.S. PATENT DOCUMENTS

| | | | |
|---|---|---|---|
| 3,369,381 A | | 2/1968 | Crane et al. |
| 3,737,748 A | | 6/1973 | Teders |
| 4,374,353 A | | 2/1983 | Habisohn |
| 4,482,783 A | * | 11/1984 | Laimins ...................... 177/147 |
| 4,918,771 A | * | 4/1990 | James ........................ 5/87.1 |
| 5,097,185 A | | 3/1992 | Ogasawara |
| 5,329,217 A | | 7/1994 | Kerkman et al. |
| 5,337,908 A | * | 8/1994 | Beck, Jr. .................... 212/312 |
| 5,544,371 A | | 8/1996 | Fuller |
| 5,692,253 A | * | 12/1997 | Keijser et al. ................ 5/83.1 |
| 5,819,338 A | * | 10/1998 | Hession ....................... 5/86.1 |
| 6,201,195 B1 | * | 3/2001 | Carey ........................ 177/144 |

* cited by examiner

*Primary Examiner*—Linh M. Nguyen (57) ABSTRACT

An apparatus, method and program product position a powered examination chair at a constant, desired speed despite fluctuations line voltage. A power signal supplied to an actuating motor of the chair is apportioned according to the line voltage supplied to the chair. The desired speed may be customized by a user in the field.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3, 15 and 28 are cancelled.

Claims 1, 14, 18 and 31 are determined to be patentable as amended.

Claims 2, 4-13, 16-17, 19-27 and 29-31, dependent on an amended claim, are determined to be patentable.

New claims 32 and 33 are added and determined to be patentable.

1. A method of positioning a patient support apparatus powered by a line voltage at a desired speed, comprising:
   *determining the line voltage applied to the patient support apparatus with a sensor having a resistor and generating a control signal;*
   receiving [a] *the* control signal indicative of the line voltage supplied to the patient support apparatus; and
   driving a motor configured to move the patient support apparatus at the desired speed using the control signal, wherein driving the motor further includes driving the motor at the desired speed for a first period corresponding to a first portion of a distance traveled by the support apparatus and at a second desired speed for a second period corresponding to a second portion of the distance traveled by the support apparatus.

14. A method of positioning a patient support apparatus at a desired speed, comprising:
    receiving input indicating a desired speed at a controller of the patient support apparatus, wherein the patient support apparatus includes a moveable support surface, wherein receiving the input further includes receiving input particular to at least one of a direction, a first portion of a distance traveled by the movable support apparatus, and a second desired speed for a second period corresponding to a second portion of the distance traveled by the movable support apparatus;
    *determining a current flowing through the electric motor with a sensor having a resistor;*
    *determining a motor voltage applied to the electric motor with the sensor;*
    processing the input, *current flow, and motor voltage* to generate a control signal; and
    moving the moveable support surface at the desired speed in response to receiving the control signal.

18. A patient support apparatus, comprising:
    a moveable support surface;
    an electric motor for driving the moveable support surface at a desired speed in response to a power signal comprising a power level;
    a sensor having an output used to generate a control signal indicative of line voltage supplied to the patient support apparatus; and
    a controller for processing the control signal and initiating generation of the power signal according to the control signal,
    *wherein the sensor includes a resistor.*

31. A patient support apparatus, comprising:
    a moveable support surface;
    an electric motor for driving the moveable support surface at a desired speed in response to a power signal;
    an input mechanism for receiving input indicating the desired speed, wherein receiving the input further includes receiving input particular to at least one of a direction, a first portion of a distance traveled by the movable support surface, and a second desired speed for a second period corresponding to a second portion of the distance traveled by the movable support surface; [and]
    *a sensor having an output used to generate a control signal indicative of line voltage supplied to the electric motor;* and
    a controller for initiating generation of the power signal configured to cause the electric motor to drive the moveable support surface at the desired speed, wherein the power signal is generated according to the desired speed *and the control signal generated by the sensor,* and
    *wherein the sensor includes a resistor.*

32. *The patient support apparatus of claim 31, wherein the sensor is configured to determine a current flowing through the electric motor.*

33. *The patient support apparatus of claim 31, wherein the sensor is configured to determine a motor voltage applied to the electric motor.*

\* \* \* \* \*